(12) United States Patent
Tokunaga et al.

(10) Patent No.: US 12,432,435 B2
(45) Date of Patent: Sep. 30, 2025

(54) IN-VEHICLE CAMERA SHIELD STATE DETERMINATION DEVICE

(71) Applicants: TOYOTA JIDOSHA KABUSHIKI KAISHA, Toyota (JP); DENSO CORPORATION, Kariya (JP)

(72) Inventors: Yutaka Tokunaga, Toyota (JP); Yusuke Tatesumi, Seto (JP); Yuichi Kato, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 175 days.

(21) Appl. No.: 18/354,852

(22) Filed: Jul. 19, 2023

(65) Prior Publication Data

US 2024/0040222 A1 Feb. 1, 2024

(30) Foreign Application Priority Data

Jul. 26, 2022 (JP) ................................ 2022-118665

(51) Int. Cl.
*H04N 23/55* (2023.01)
*G06V 10/74* (2022.01)
*G06V 20/56* (2022.01)

(52) U.S. Cl.
CPC ........... *H04N 23/55* (2023.01); *G06V 10/761* (2022.01); *G06V 20/56* (2022.01); *G06V 2201/07* (2022.01)

(58) Field of Classification Search
CPC .... H04N 23/55; H04N 17/002; H04N 5/2171; H04N 5/372; H04N 5/225; H04N 5/37213; G06V 10/761; G06V 20/56; G06V 2201/07; G06T 2207/10016; G06T 2207/10028; G06T 2207/30261; G06T 7/0004; B60S 1/56; B60S 1/0848; G08G 1/16; B60R 11/04; G02B 13/0015
See application file for complete search history.

(56) References Cited

U.S. PATENT DOCUMENTS 10,427,689 B2  10/2019 Tokimasa
10,486,698 B2  11/2019 Masui
(Continued)

FOREIGN PATENT DOCUMENTS

JP  2001211449 A  8/2001
JP  2007038773 A  2/2007
(Continued)

*Primary Examiner* — Abdelaaziz Tissire
(74) *Attorney, Agent, or Firm* — Dinsmore & Shohl LLP

(57) ABSTRACT

Provided is an in-vehicle camera shield state determination device which determines a shield state of an external camera of a vehicle, the device determines whether or not shield is detected by image processing of a captured image, determines whether or not an object is close to the vehicle in an imaging direction of the external camera, based on a detection result of an external sensor of the vehicle, determines whether or not the external camera is in the shield state, based on a detection result of a shield detection unit and a determination result of a proximity determination unit, and even if shield is detected by image processing of the captured image, when it is determined that the object is close to the vehicle in the imaging direction of the external camera, it is not determined that the external camera is in the shield state.

2 Claims, 5 Drawing Sheets

(56) References Cited

U.S. PATENT DOCUMENTS

| | | | |
|---|---|---|---|
| 10,731,996 B2 | 8/2020 | Naito | |
| 10,814,873 B2 | 10/2020 | Dakemoto | |
| 10,922,561 B2 | 2/2021 | Ozawa | |
| 11,017,247 B2 | 5/2021 | Hayashi | |
| 11,072,328 B2 | 7/2021 | Masui | |
| 11,235,766 B2 | 2/2022 | Masui | |
| 11,247,671 B2 | 2/2022 | Komori | |
| 2008/0192984 A1* | 8/2008 | Higuchi | G06V 20/56 382/104 |
| 2014/0300744 A1* | 10/2014 | Kasahara | H04N 23/75 348/148 |
| 2015/0172582 A1* | 6/2015 | Kiyohara | B60S 1/56 348/322 |
| 2015/0177512 A1* | 6/2015 | Hayakawa | G02B 27/0006 348/148 |
| 2015/0334385 A1* | 11/2015 | Takemura | H04N 17/002 348/175 |
| 2015/0353013 A1* | 12/2015 | Sato | G06V 10/56 348/118 |
| 2016/0280229 A1* | 9/2016 | Kasahara | G06V 10/141 |
| 2020/0326191 A1 | 10/2020 | Naito | |
| 2021/0097305 A1* | 4/2021 | Kokubo | B60R 1/002 |
| 2021/0364631 A1 | 11/2021 | Hasegawa | |

FOREIGN PATENT DOCUMENTS

| | | |
|---|---|---|
| JP | 5680436 B2 | 3/2015 |
| JP | 2015232824 A | 12/2015 |
| JP | 2020092365 A | 6/2020 |

\* cited by examiner

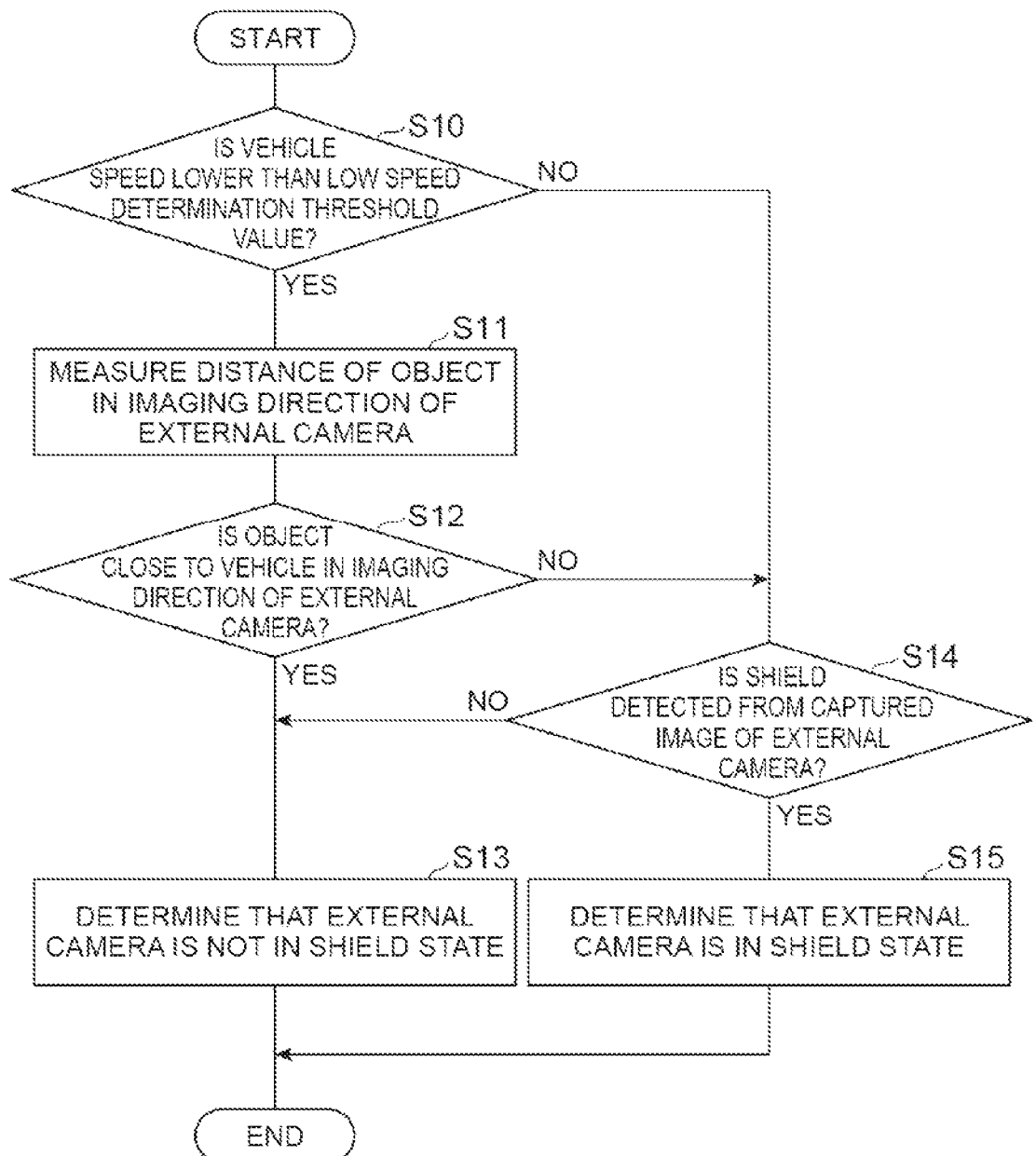

IN-VEHICLE CAMERA SHIELD STATE DETERMINATION DEVICE

CROSS-REFERENCE TO RELATED APPLICATIONS

This application is based upon and claims the benefit of priority from Japanese Patent Application No. 2022-118665, filed on Jul. 26, 2022. The entire contents of which are incorporated herein by reference.

TECHNICAL FIELD

The present disclosure relates to an in-vehicle camera shield state determination device.

BACKGROUND

In the related art, Japanese Unexamined Patent Publication No. 2015-232824 is known as a technical document relating to an in-vehicle camera shield state determination device. This publication discloses a device that detects a shielded area in which imaging by a camera is shielded due to a foreign matter adhering to a camera lens or the like, based on an image captured by the camera.

SUMMARY

However, in the above-described shield detection in the related art, the image of the camera becomes an image of the snow wall being uniform when the vehicle is near the snow wall. As a result, there is a risk of erroneously determining that the camera is in a shielded state due to the presence of adhering foreign matter.

According to an aspect of the present disclosure, there is provided an in-vehicle camera shield state determination device which determines a shield state of an external camera mounted on a vehicle, including: a shield detection unit configured to determine whether or not shield is detected by image processing of a captured image of the external camera, based on the captured image; a proximity determination unit configured to determine whether or not an object is close to the vehicle in an imaging direction of the external camera, based on a detection result of an external sensor of the vehicle; and a shield state determination unit configured to determine whether or not the external camera is in the shield state, based on a detection result of the shield detection unit and a determination result of the proximity determination unit, in which even if the shield detection unit detects shield by image processing of the captured image, when the proximity determination unit determines that the object is close to the vehicle in the imaging direction of the external camera, the shield state determination unit is configured not to determine that the external camera is in the shield state.

According to the in-vehicle camera shield state determination device according to an aspect of the present disclosure, even if the shield detection unit detects the shield by the image processing of the captured image, when the proximity determination unit determines that the object is close to the vehicle in the imaging direction of the external camera, it is not determined that the external camera is in the shield state, so that it is possible to avoid erroneously determining that the external camera is in the shield state due to the object being close to the vehicle.

In the in-vehicle camera shield state determination device according to an aspect of the present disclosure, when the proximity determination unit determines that the object is close to the vehicle in the imaging direction of the external camera, the shield detection unit may be configured not to detect the shield by image processing on the captured image.

In the in-vehicle camera shield state determination device according to an aspect of the present disclosure, a vehicle speed determination unit configured to determine whether or not a vehicle speed of the vehicle is less than a low speed determination threshold value, in which when the vehicle speed determination unit does not determine that the vehicle speed of the vehicle is less than the low speed determination threshold value, the shield state determination unit may be configured to determine whether or not the external camera is in the shield state, based on the detection result of the shield detection unit, regardless of determination by the proximity determination unit.

According to the aspect of the present disclosure, it is possible to prevent an external camera from being erroneously determined to be in a shield state due to an object being close to a vehicle.

BRIEF DESCRIPTION OF THE DRAWINGS

FIG. 5 is a flowchart illustrating an example of a camera shield state determination process.

DETAILED DESCRIPTION

Hereinafter, the embodiment of the present disclosure will be described with reference to the drawings.

Figure 1:
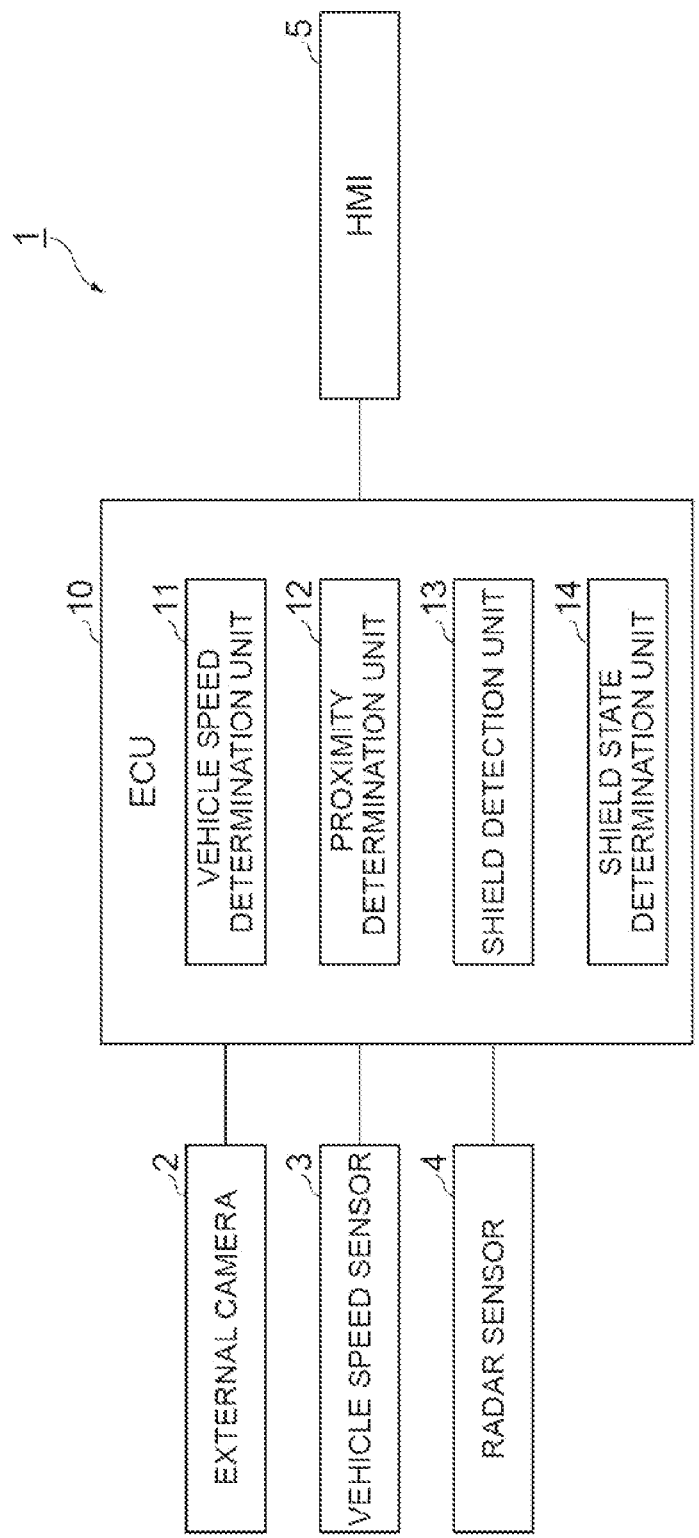
FIG. 1 is a block diagram illustrating an in-vehicle camera shield state determination device according to an embodiment.

An in-vehicle camera shield state determination device 1 illustrated in FIG. 1 is a device that determines whether or not an external camera 2 mounted on a vehicle such as a passenger car or a freight vehicle is in a shield state. The in-vehicle camera shield state determination device 1 includes an ECU 10, an external camera 2, a vehicle speed sensor 3, a radar sensor 4, and a human machine interface (HMI) 5. The in-vehicle camera shield state determination device 1 according to the present embodiment can also be applied to an autonomous driving vehicle.

The shield state is a state in which the external camera 2 cannot appropriately image the area around the vehicle due to a foreign matter adhering to the lens of the external camera 2 or the like. When the external camera 2 is installed inside a window glass of the vehicle, the external camera 2 is also in the shield state due to the adhesion of a foreign matter to the window glass.

Figure 2:
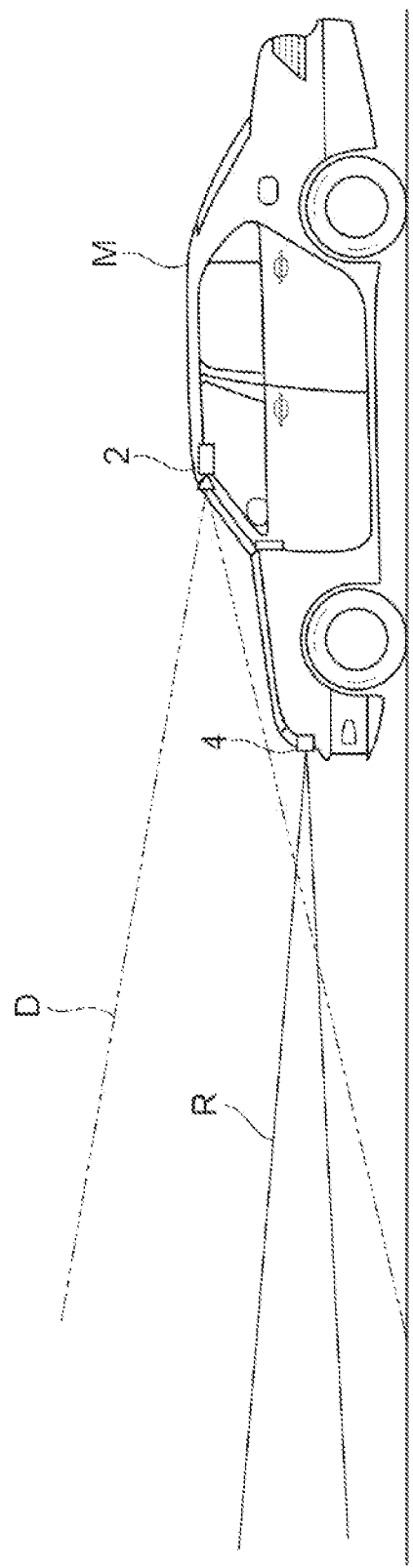
FIG. 2 is a diagram illustrating an example of a situation in which an external camera of a vehicle is not in a shield state.

FIG. 2 is a diagram illustrating an example of a situation in which the external camera 2 of a vehicle is not in a shield state. FIG. 2 illustrates a vehicle M, the external camera 2, an imaging range D (two-dot chain line) of the external camera 2, the radar sensor 4, and a detection range R of the radar sensor 4. In the situation illustrated in FIG. 2, no foreign matter adheres to the external camera 2, and the external camera 2 is not in the shield state.

Figure 3:
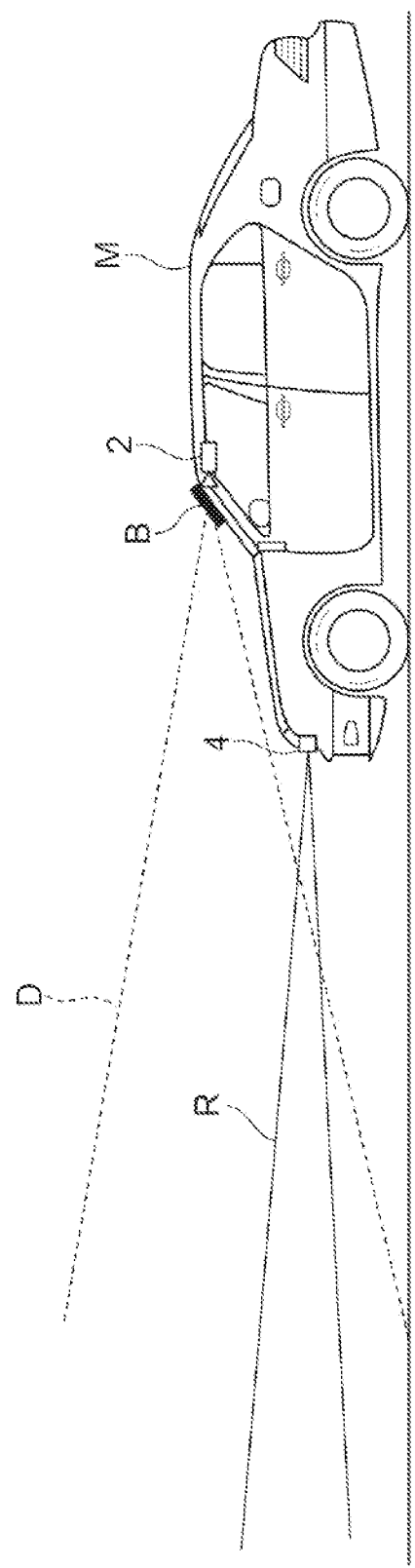
FIG. 3 is a diagram illustrating an example of a situation in which the external camera of the vehicle is in a shield state.

FIG. 3 is a diagram illustrating an example of a situation in which the external camera of the vehicle is in a shield state. FIG. 3 shows a foreign matter B. The foreign matter B is not particularly limited. The foreign matter B can include various obstructions such as dirt, freezing snow, and even tree. The foreign matter B adheres to the windshield in front of the lens of the external camera 2, thereby blocking the imaging range D. In FIG. 3, the imaging range D shielded by the foreign matter B is indicated by a broken line. In the situation shown in FIG. 3, the external camera 2 is determined to be in the shield state.

Configuration of In-Vehicle Camera Shield State Determination Device

As shown in FIG. 1, an in-vehicle camera shield state determination device 1 includes an electronic control unit (ECU) 10 for collectively managing the device. The ECU 10 is an electronic control unit having a Central Processing Unit (CPU) and a storage unit such as a Read Only Memory (ROM) or a Random Access Memory (RAM). In the ECU 10, for example, various functions are implemented by the CPU executing a program stored in the storage unit. The ECU 10 may be configured with a plurality of electronic units. The ECU 10 may be configured as a unit integrated with the external camera 2 or may be configured as a unit separate from the external camera 2.

The ECU 10 is connected to the external camera 2, the vehicle speed sensor 3, the radar sensor 4, and the HMI 5. The external camera 2 is a camera for imaging the surroundings of the vehicle. The external camera 2 includes a front camera that images the front of the vehicle. The external cameras 2 used in the following description can all be read as the front camera. The front camera may be installed inside the windshield of the vehicle M, or may be a panoramic view camera. The panoramic view camera may be installed on the grill or bumper of the vehicle M. The external camera 2 may include a rear camera that images the rear of the vehicle or may include a side cameras (a left side camera and a right side camera) that images the side of the vehicle. The external camera 2 may be a camera having a distance measuring function such as a stereo camera. The external camera 2 may be a monocular camera capable of measuring a distance of an object in the captured image by performing a predetermined image process on the captured image.

The vehicle speed sensor 3 is a detector that detects the vehicle speed of the vehicle M. As the vehicle speed sensor 3, for example, a vehicle wheel speed sensor is used, which is provided on vehicle wheels of the vehicle M or on a drive shaft rotating integrally with vehicle wheels, and detects a rotational speed of the vehicle wheels. The vehicle speed sensor 3 transmits the detected vehicle speed information (vehicle wheel speed information) to the ECU 10.

The radar sensor 4 is an external sensor for detecting an object outside the vehicle M. The radar sensor 4 includes, for example, a millimeter wave radar or a light detection and ranging (LIDAR). The radar sensor 4 detects an object around the vehicle M by using radio waves (for example, millimeter waves) or light, and also detects a distance between the vehicle M and the object. That is, the radar sensor 4 also functions as a distance measurement sensor that measures a distance between the vehicle M and an external object. The radar sensor 4 transmits information on the detected object (including position information and distance information of the object with respect to the vehicle M) to the ECU 10.

The external sensor (distance measurement sensor) is not limited to the radar sensor 4. The external sensor (distance measurement sensor) may be a sonar sensor, and the external camera 2 capable of measuring a distance may be adopted.

The HMI 5 is an interface that performs inputting and outputting of information between the in-vehicle camera shield state determination device 1 and the driver. The HMI 5 includes, for example, a display and a speaker. The HMI 5 outputs an image on the display and/or outputs a sound from the speaker according to a control signal from the ECU 10. The display may be a multi information display (MID) or a head up display (HUD). The HMI 5 may have an indicator lamp that lights or flicker during the shield state determination the external camera 2.

Next, the functional configuration of the ECU 10 will be described. The ECU 10 includes a vehicle speed determination unit 11, a proximity determination unit 12, a shield detection unit 13, and a shield state determination unit 14.

The vehicle speed determination unit 11 determines whether or not the vehicle speed of the vehicle M is less than a low speed determination threshold value, based on the detection result of the vehicle speed sensor 3. The low speed determination threshold value is a threshold value of a preset value. The low speed determination threshold value is set to an appropriate value to prevent an erroneous determination of the shield state of the external camera 2 from being performed. The low speed determination threshold value may be set as a value at which it can be determined whether the vehicle M is stopped or traveling. The low speed determination threshold value may be set as 0.5 km/h, may be set as 1 km/h, may be set as 5 km/h, or may be set as km/h. The value of the low speed determination threshold value is not particularly limited. The low speed determination threshold value may be used as the stop determination threshold value.

The proximity determination unit 12 determines whether or not the object is close to the vehicle M in the imaging direction of the external camera 2, based on the detection result of the external sensor (for example, the radar sensor 4). The imaging direction of the external camera 2 is the front of the vehicle for a front camera, the rear of the vehicle for a rear camera, and the side of the vehicle for a side camera (the direction in which the camera is facing, among the vehicle left direction and the vehicle right direction). The imaging direction of the external camera 2 may be the optical axis direction of the camera lens.

An object is assumed to be a snow wall, a wall of a structure, another vehicle approaching due to traffic congestion, or the like. The other vehicle is, for example, could be a large van body truck having a flat cargo bed rear surface. The proximity determination unit 12 may not perform the proximity determination in the case of an object smaller than a certain size. The proximity determination unit 12 may not perform proximity determination when the object is moving at a certain speed or more, or may not perform proximity determination when the relative speed between the object and the vehicle M is equal to or higher than a certain value. When the height of the object does not reach the attachment height of the external camera 2, the proximity determination unit 12 may not perform the proximity determination.

The proximity determination unit 12 measures a distance of the object in the imaging direction of the external camera 2, based on the detection result of the external sensor. For example, the proximity determination unit 12 determines whether or not the object is positioned in the imaging direction of the external camera 2 based on the position information on the object with respect to the vehicle M detected by the radar sensor 4, and recognizes (distance measurement) the distance between the object and the vehicle M, based on the distance information on the object detected by the radar sensor 4. Instead of the radar sensor 4, an external camera 2 capable of measuring a distance may be used.

For example, when the distance between the object and the vehicle M is less than the distance threshold value, the proximity determination unit 12 determines that the object is close to the vehicle M. The distance threshold value is a threshold value of a preset value. The distance threshold value is not particularly limited, but it could be any distance between 0 m and 2 m. The distance threshold value may be 0.5 m or 1 m. When a plurality of cameras are present as the external cameras 2, the proximity determination unit 12 performs the proximity determination for each imaging direction of each camera.

Figure 4:
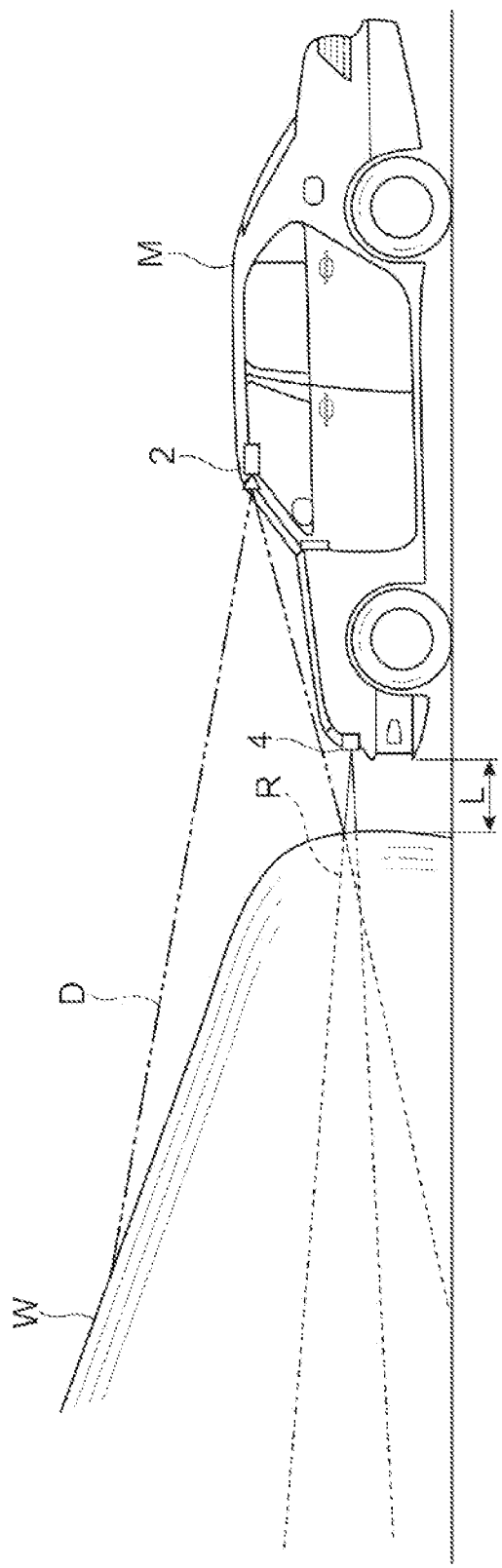
FIG. 4 is a diagram illustrating an example of a situation in which the snow wall is close to the vehicle.

FIG. 4 is a diagram illustrating an example of a situation in which the snow wall is close to the vehicle M. FIG. 4 shows a snow wall W. In the situation illustrated in FIG. 4, the proximity determination unit 12 recognizes the distance L between the snow wall W and the vehicle M, based on the detection result of the radar sensor 4. Since the distance L between the snow wall W and the vehicle M is less than the distance threshold value, the proximity determination unit 12 determines that the snow wall W is close to the vehicle M.

The shield detection unit 13 determines whether or not shield is detected by image processing on the captured image of the external camera 2, based on the captured image of the external camera 2. For example, when a uniform image pattern without a feature amount spreads throughout the captured image, the shield detection unit 13 determines that the shield in the captured image of the external camera 2 is detected.

The shield detection unit 13 may determine that the shield is detected when it is determined that the entire image is uniform, based on the brightness of the captured image, for example. Specifically, when the entire image has pixels of a predetermined percentage or more of the entire image in which the brightness of color component of each of R, G, and B is a certain threshold value or less, the shield detection unit 13 can determine that the shield is detected. The shield detection unit 13 may determine that shield is detected, when the entire image has pixels of a predetermined percentage or more of the entire image in which the fluctuation width of the brightness of color component of each of R, G, and B in a predetermined time is a certain threshold value or less. The image processing for shield detection is not particularly limited, and a well-known technique can be adopted. When there are a plurality of cameras as the external cameras 2, the shield detection unit 13 determines the detection of the shield for each captured image of each camera.

The shield state determination unit 14 determines whether or not the external camera 2 is in the shield state, based on the determination result of the vehicle speed determination unit 11, the determination result of the proximity determination unit 12, and the detection result of the shield detection unit 13. When there are a plurality of cameras as the external cameras 2, the shield state determination unit 14 determines whether or not each of the cameras is in a shield state. In a case where the shield detection unit 13 does not determine that shield is detected by image processing on the captured image of the external camera 2, the shield state determination unit 14 does not determine that the external camera 2 is in the shield state.

In a case where the vehicle speed determination unit 11 determines that the vehicle speed of the vehicle M is less than a low speed determination threshold value, when the proximity determination unit 12 determines that an object is close to the vehicle M in the imaging direction of the external camera 2, even if the shield detection unit 13 detects shield by image processing on the captured image of the external camera 2, the shield state determination unit 14 does not determine that the external camera 2 is in the shield state. In this case, the determination target of the proximity determination unit 12 and the detection target of the shield detection unit 13 are the same external camera 2.

On the other hand, in a case where the vehicle speed determination unit 11 determines that the vehicle speed of the vehicle M is less than a low speed determination threshold value, when the proximity determination unit 12 does not determine that an object is close to the vehicle M in the imaging direction of the external camera 2, if the shield detection unit 13 detects shield by image processing on the captured image of the external camera 2, the shield state determination unit 14 determines that the external camera 2 is in the shield state.

When the vehicle speed determination unit 11 determines that the vehicle speed of the vehicle M is less than the low speed determination threshold value, the shield state determination unit 14 does not perform the determination by the proximity determination unit 12. In this case, the shield state determination unit 14 determines whether or not the external camera 2 is in the shield state, based on the detection result of the shield detection unit 13. When the shield detection unit 13 determines that the shield is detected by image processing on the captured image of the external camera 2, the shield state determination unit 14 determines that the external camera 2 is in the shield state. When the shield detection unit 13 does not determine that shield is detected by image processing on the captured image of the external camera 2, the shield state determination unit 14 does not determine that the external camera 2 is in the shield state.

When it is determined that the external camera 2 is in the shield state, the shield state determination unit 14 notifies the driver by HMI 5 that the external camera 2 is in the shield state. The shield state determination unit 14 notifies the driver that the external camera 2 is in the shield state by the image output of the display, the sound output of the speaker, or the lighting of the indicator lamp.

Processing by In-Vehicle Camera Shield State Determination Device

Subsequently, the processing by the in-vehicle camera shield state determination device 1 according to the present embodiment will be described with reference to FIG. 5. FIG. 5 is a flowchart illustrating an example of a camera shield state determination process. The camera shield state determination process is executed, for example, when the engine of the vehicle M is in an ON state.

As illustrated in FIG. 5, in S10, the ECU 10 of the in-vehicle camera shield state determination device 1 determines whether or not the vehicle speed of the vehicle M is less than a low speed determination threshold value by the vehicle speed determination unit 11. The vehicle speed determination unit 11 makes a determination based on the detection result of the vehicle speed sensor 3. When it is determined that the vehicle speed of the vehicle M is less than the low speed determination threshold value (S10: YES), the ECU 10 proceeds to S11. When it is not determined that the vehicle speed of the vehicle M is less than the low speed determination threshold value (S10: NO), the ECU 10 proceeds to S14.

In S11, the ECU 10 measures the distance of the object in the imaging direction of the external camera 2 by the proximity determination unit 12. For example, the proximity determination unit 12 determines whether or not the object is positioned in the imaging direction of the external camera 2 based on the position information on the object with respect to the vehicle M detected by the radar sensor 4, and recognizes (distance measurement) the distance between the object and the vehicle M, based on the distance information on the object detected by the radar sensor 4.

In S12, the ECU 10 determines whether or not the object is close to the vehicle M in the imaging direction of the external camera 2 by the proximity determination unit 12. For example, when the distance between the object and the vehicle M is less than the distance threshold value, the proximity determination unit 12 determines that the object is close to the vehicle M. When it is determined that the object is close to the vehicle M in the imaging direction of the external camera 2 (S12: YES), the ECU 10 proceeds to S13. When it is not determined that the object is close to the vehicle M in the imaging direction of the external camera 2 (S12: NO), the process proceeds to S14.

In S13, the ECU 10 determines that the external camera 2 is not in the shield state by the shield state determination unit 14. After that, the ECU 10 ends the camera shield state determination process this time.

In S14, the ECU 10 determines whether or not the shield detection unit 13 detects shield by image processing on the captured image of the external camera 2. The shield detection unit 13 determines that shield is detected, based on the captured image of the external camera 2, for example, when the entire image has pixels of a predetermined percentage or more of the entire image in which the brightness of color component of each of R, G, and B is a certain threshold value or less. When it is determined that the shield is detected by image processing on the captured image (S14: YES), the ECU 10 proceeds to S15. When it is not determined that the shield is detected by image processing on the captured image (S14: NO), the ECU 10 proceeds to S13.

In S15, the ECU 10 determines that the external camera 2 is in the shield state by the shield state determination unit 14. The shield state determination unit 14 notifies the driver by the HMI 5 that the external camera 2 is in the shield state. After that, the ECU 10 ends the camera shield state determination process this time.

According to the in-vehicle camera shield state determination device 1 according to the present embodiment described above, even if the shield detection unit 13 detects the shield by the image processing of the captured image, when the proximity determination unit 12 determines that the object is close to the vehicle M in the imaging direction of the external camera 2, it is not determined that the external camera 2 is in the shield state, so that it is possible to avoid erroneously determining that the external camera 2 is in the shield state due to the object being close to the vehicle M.

In addition, according to the in-vehicle camera shield state determination device 1, when the proximity determination unit 12 determines that an object is close to the vehicle M in the imaging direction of the external camera 2, the shield detection by image processing on the captured image of the external camera 2 is not performed, it is possible to avoid performing unnecessary image processing for shield detection, as compared with the case where the shield detection by image processing is always performed.

Further, according to the in-vehicle camera shield state determination device 1, when the vehicle speed determination unit 11 does not determine that the vehicle speed of the vehicle M is less than the low speed determination threshold value, regardless of the determination by the proximity determination unit 12, it is determined that the external camera 2 is in the shield state, based on the detection result of the shield detection unit 13, so that it is possible to avoid forcibly reducing the determination of the shield state, based on the determination of the proximity determination unit 12 until the vehicle M is traveling at a sufficient speed and the possibility of erroneous determination of the shield state due to the closeness of the object is low.

Although the embodiment of the present disclosure has been described above, the present disclosure is not limited to the above-described embodiment. The present disclosure can be implemented in various forms including various modifications and improvements based on the knowledge of those skilled in the art, including the above-described embodiment.

The ECU 10 of the in-vehicle camera shield state determination device 1 does not necessarily need to include the vehicle speed determination unit 11. The ECU 10 may always make the determination by the proximity determination unit 12 without considering the vehicle speed of the vehicle M. In this case, the shield state determination unit 14 does not need to change the influence of the determination result of the proximity determination unit 12 on the final result of determination of the shield state according to the vehicle speed.

When the proximity determination unit 12 determines that an object is close to the vehicle M, the ECU 10 does not need to necessarily prohibit the detection of the shield by the shield detection unit 13. When the proximity determination unit 12 determines that an object is close to the vehicle M, the ECU 10 may detect the shield of the shield detection unit 13.

The order of the proximity determination process in S12 in FIG. 5 and the shield detection process in S14 may be reversed. In this case, when the shield is not detected by image processing on the captured image of the external camera 2, in the shield detection processing performed earlier, the ECU 10 may not perform the proximity determination processing.

What is claimed is:

1. An in-vehicle camera shield state determination device which determines a shield state of an external camera mounted on a vehicle, comprising an electronic control unit configured to:
   determine whether a speed of the vehicle is less than a predetermined threshold speed;
   upon determination that the speed of the vehicle is less than the predetermined threshold speed:
      measure a distance of an object in an imaging direction of an external camera;
      determine whether the distance of the object is less than a predetermined distance threshold;
      upon determination that the distance of the object is less than the predetermined distance threshold, determine that the external camera is not in the shield state;
      upon determination that the distance of the object is not less than the predetermined distance threshold, determine whether or not a shield is detected by image processing of a captured image of the external camera, based on the captured image;
      upon determination that the shield is detected, determine that the external camera is in the shield state; and upon determination that the shield is not detected, determine that the external camera is not in the shield state.

2. The in-vehicle camera shield state determination device according to claim 1, wherein
when the electronic control unit determines that the distance of the object is less than the predetermined distance threshold, the electronic control unit is configured not to detect the shield by image processing on the captured image.

* * * * *